United States Patent [19]

Kraning et al.

[11] Patent Number: 5,194,851
[45] Date of Patent: Mar. 16, 1993

[54] STEERING CONTROLLER

[75] Inventors: Calvin J. Kraning, Valley City; Jeffrey S. Milender, Jamestown, both of N. Dak.

[73] Assignee: Case Corporation, Racine, Wis.

[21] Appl. No.: 658,982

[22] Filed: Feb. 21, 1991

[51] Int. Cl.$^5$ .................. G08B 21/00; B62D 5/06; B60Q 1/00
[52] U.S. Cl. .................. 340/686; 180/140; 280/91; 340/438; 340/506; 340/691; 364/424.01
[58] Field of Search ............ 340/686, 691, 438, 456, 340/517, 520–521, 506; 180/140–142, 79.1; 364/424.01, 424.05; 280/91

[56] References Cited

U.S. PATENT DOCUMENTS

| | | | |
|---|---|---|---|
| 4,175,638 | 11/1979 | Christensen | 180/140 |
| 4,696,486 | 9/1987 | Ruhter | 340/438 X |
| 4,703,820 | 11/1987 | Reinaud | 340/686 X |
| 4,728,923 | 3/1988 | Finger | 340/686 X |
| 4,893,689 | 1/1990 | Laurich-Trost | 180/140 |
| 5,039,978 | 8/1991 | Kronberg | 340/691 X |

Primary Examiner—Jin F. Ng
Assistant Examiner—Thomas J. Mullen, Jr.
Attorney, Agent, or Firm—Jansson & Shupe

[57] ABSTRACT

The improved steering controller is of the type used to control the angular position of the rear wheels on a four-wheel-steer vehicle as a function of the angular position of the front, operator-steered wheels. The controller includes a computing section, a visual display of the alpha-numeric type and a visual indicator which provides a bar-like display having a number of individual "markers" arranged in a row. The apparent length of such bar-like display, which changes as markers are illuminated, apprises the vehicle operator of the approximate magnitude and direction of angular displacement of the rear wheels from the centered position. The alpha-numeric visual display indicates operational mode as well as "errors" used in troubleshooting diagnosis and repair. The controller also incorporates a "learn" feature whereby the threshold input power and coil operating current of the steering hydraulic valve are determined and stored in a memory section to provide more consistent valve operation and to reduce setup time. Matched or proportional steering is provided.

16 Claims, 15 Drawing Sheets

STEERING CONTROLLER

FIELD OF THE INVENTION

This invention relates generally to steering controllers and, more particularly, to such controllers for use with four wheel vehicles having "all-wheel" steering capability.

BACKGROUND OF THE INVENTION

Consistent with requirements for increased productivity, off-highway vehicles such as large agricultural tractors have steadily increased in size with the introduction of new models. In some models, such size increases were accompanied by diminished vehicle maneuverability because only the front wheels were steerable. More recently, improved vehicle designs provide for steering of all wheels. In response to such designs, improved steering systems have been developed so that as the front wheels are steered by the operator, the rear wheels are automatically steered in response thereto.

While earlier automatic steering systems were generally satisfactory, they were not without certain deficiencies. An example of such an earlier system is shown and described in U.S. Pat. No. 4,175,638 (Christensen) which is assigned to the same assignee as this invention. The Christensen system is of the analog type; that is, proportional voltages are used for several functions such as hydraulic steering valve control. For a given "standard" of accuracy, reliability and position resolution, analog systems are generally more expensive and difficult to maintain at optimum performance. This is particularly true where the system is mounted on a hard-worked, sometimes-abused off-highway vehicle.

Such system employs potentiometers to obtain the feedback signal and the setting of such potentiometers is quite critical. Potentiometer setting is required to be done with precision and occasions the use of a volt-ohmmeter, an instrument sometimes not quickly available in the field—even if there are personnel at the site who know how to use it.

Such system uses a control valve to direct hydraulic oil to the wheel steering cylinder(s) at a rate required to maintain the automatically-steered rear wheels in position coordination with the front, manually-steered wheels. Such valves have a minimum or "threshold" input power at which wheel movement is produced. If the valve is operated below this input power level, no wheel steering motion results. If, like the Christensen system, the minimum input power level is recognized in the control protocol, such power level is required to be determined by a technician and "set" in the controller to achieve satisfactory system operation. Such determination and setting is time-consuming and if the control valve is required to be replaced for some reason, is often required to be done anew. No two control valves have precisely the same threshold input power. If the system is of the type where threshold input power is not recognized and set, the system tends to be sluggish and less responsive.

Another disadvantage of such system is that even after setting the threshold input power, system responsiveness may suffer over time due to changes in the temperature of the hydraulic valve coil or coils. Such changes in temperature are usually accompanied by changes in coil resistance and therefore, with a constant input voltage, in coil current. Changes in such current affect valve and system performance.

Still another occasional disadvantage of such system (and, probably, others of its type) is that the automatically-steered wheels, if "locked" in the centered position while steering with only the front wheels, tend to drift out of position to an unacceptable angle. As a result, tires are sometimes scuffed and wear prematurely and the vehicle becomes less fuel-efficient, albeit perhaps only incrementally so. Wheel misalignment also causes unnecessary stress on steering and suspension components.

Yet another disadvantage of such earlier system and others of that type is that diagnosis of component failures is quite difficult. Often, the vehicle operator is unable to explain the resulting steering impairment with certainty. In the case of an intermittent "error" or failure, the servicing technician is occasionally required to spend a great deal of time riding and/or watching the vehicle in order to witness such failure so that necessary repairs can be performed.

OBJECTS OF THE INVENTION

It is an object of the invention to provide an improved steering controller which overcomes some of the problems and shortcomings of the prior art.

Another object of the invention is to provide an improved steering controller wherein potentiometer settings may be accomplished without the use of a volt-ohmmeter.

Still another object of the invention is to provide an improved steering controller which automatically determines and sets the threshold input power of its steering valve.

Another object of the invention is to provide an improved steering controller which automatically regulates steering valve coil current to compensate for changing coil resistance.

Yet another object of the invention is to provide an improved steering controller which minimizes wheel "drift" from a centered, locked position.

Another object of the invention is to provide an improved steering controller which is easier to trouble-shoot and repair in the field.

How these and other objects are accomplished will become more apparent from the following detailed description taken in conjunction with the drawing.

SUMMARY OF THE INVENTION

The inventive controller is primarily intended for use on off-highway, four-wheeled vehicles having a "four wheel steer" capability.

The improved vehicle steering controller is of the type used to control the angular position of a first set of wheels (e.g., the rear set) as a function of the angular position of a second set of wheels (e.g., the front set). Such controller includes a computing section having embedded therein reference data representing the centered position of the first or rear set of wheels. A visual display of the alpha-numeric type is provided to receive signals from the computing section for displaying the mode of operation such as calibration mode, "learn" mode, combination cramp steering mode as well as others.

The controller also includes a visual indicator of the quasi-analog type for receiving signals from the computing section and providing a signal representing the approximate magnitude of angular displacement of the first set of wheels from the "wheel centered" position. By viewing such indicator, the vehicle operator is apprised of the approximate angular position of such wheels. Such indicator is referred to as being of the quasi-analog type since it uses a number of individual markers, each of which is capable of exhibiting either of two "digital" or binary states, e.g., on or off.

In a highly preferred embodiment, such markers define a bar-like display. When the first set of wheels is displaced through an angle from the centered position, a marker changes binary state. And a progressively greater number of markers change state with increasing angular displacement of the wheels from center. Although the bar-like display is made up of discrete binary markers, the visual impression received by the operator is analog in nature. That is, the bar-like display shows the approximate magnitude of displacement in that its apparent length increases with increasing angular wheel displacement and decreases with decreasing displacement.

Preferably, such markers are arranged into first and second marker groups between which is a center marker. These first and second groups indicate angular displacement in first and second directions, respectively, from the centered position.

Four wheel steer vehicles of the type described above often have the rear set of wheels angularly positioned by at least one hydraulic cylinder coupled to a control valve operable over an input power range. The new controller incorporates a setup sequence during which small, sequential increments of increasing input power are applied to the valve until a wheel movement signal is produced. Such signal may be produced by a signal generator such as a potentiometer having its movable element coupled to a wheel kingpin for movement substantially coincident with that of the kingpin.

The aforementioned input power is referred to as the "threshold power" since it is the minimum input power at which wheel movement occurs. The signal representing such input power is "learned" by storing it in the memory of the computing section. Thereafter when angular steering is required, input power is applied to the valve at the threshold power level or above. This feature helps decrease the time required to place the controller into operation and improves controller responsiveness.

Such wheel movement signal occurs at a value of electrical current in the control valve, sometimes referred to as the "threshold current." In a highly preferred embodiment, a signal representing such value of current is also "learned" by storing a signal representing it in the memory section. This stored signal is of significant value for the following reason. Because of valve operation and/or changes in ambient temperature, the valve coil temperature changes and with it, the electrical resistance of the coil. The controller uses such stored current signal to compensate for changes in coil resistance by slightly increasing or decreasing the voltage applied to the coil.

A significant disadvantage of earlier controllers is that field service personnel often have sparse information available on which to base a troubleshooting diagnosis and repair. Very frequently, the vehicle operator can offer little in the way of aid other than to indicate that the vehicle "doesn't run right" or words to that effect.

The improved controller overcomes this deficiency in that it detects errors in components and parameters associated with it. For example, such detected errors may include a low voltage condition, a current overload and certain open or short circuit conditions in a potentiometer. When properly "interrogated" by a service person, the visual display provides "last error recall" by displaying the last error detected by the controller. This is especially helpful where the error is of an intermittent nature. Diagnosis and repair proceed much more quickly and the availability or "uptime" of the vehicle is thereby improved. In a highly preferred embodiment, the controller also deactivates the control valve when an error is detected. This helps prevent operation under conditions which may damage the vehicle.

DETAILED DESCRIPTION OF PREFERRED EMBODIMENTS

Figure 1:
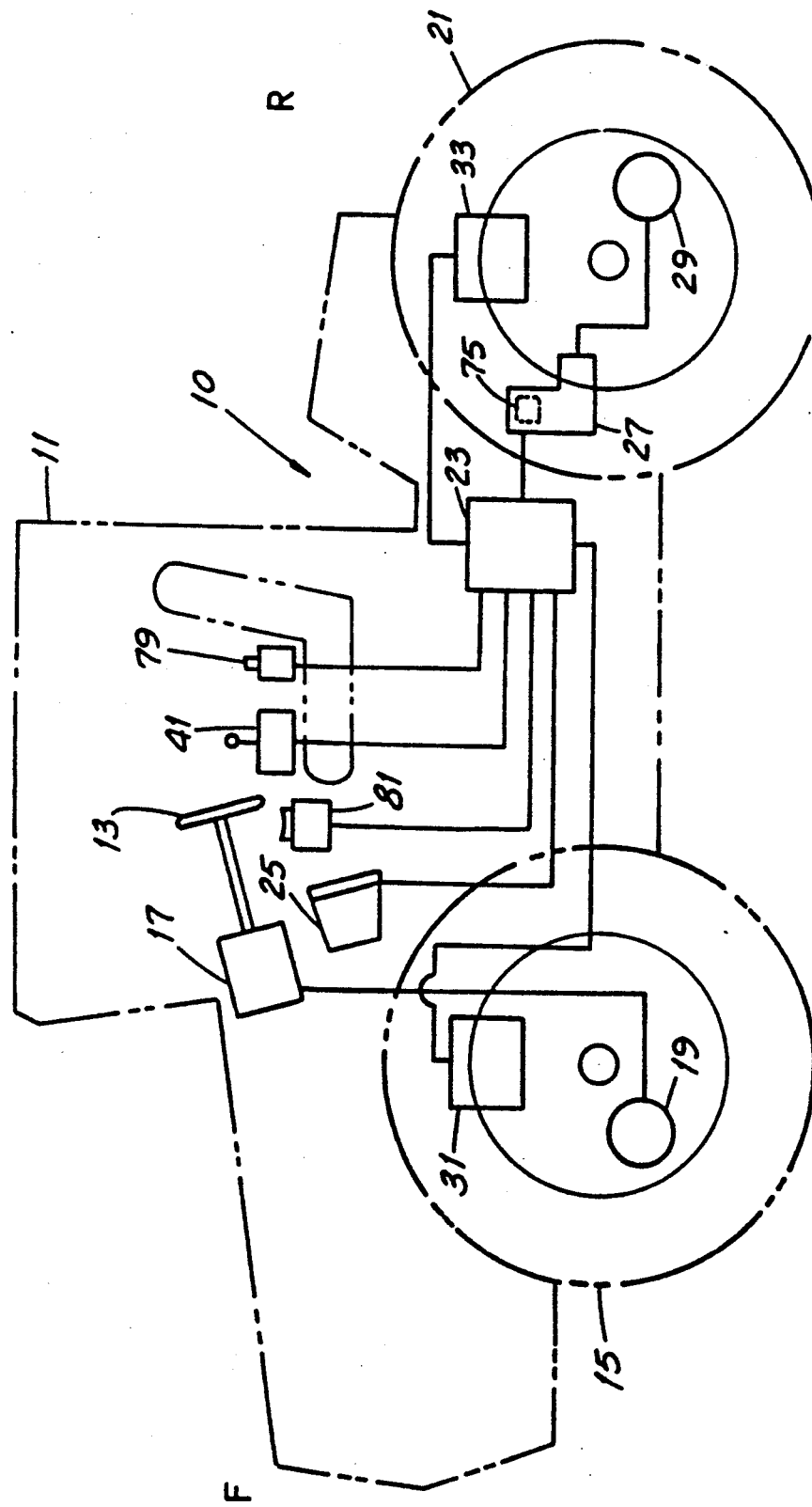
FIG. 1 is a representative side elevation view, in phantom, showing the inventive controller in conjunction with a four-wheel-steer vehicle.

Referring to FIG. 1, the improved vehicle steering controller 10 is intended for use on vehicles such as large agricultural tractors 11 used to pull towed implements and for ancillary purposes. The representative tractor 11 has a conventional steering wheel 13 used by the operator to steer one set of wheels, usually the front wheels 15. Because of the size and weight of such tractors, they are almost invariably equipped with a power steering unit 17 wherein the wheels 15 are angularly positioned by actuating one or two hydraulic cylinders 19.

The controller 10 is further intended for use on such vehicles having a four wheel steering capability. Such controller 10 selects the angular position of a first set of wheels 21 (e.g., the rear set) as a function of the angular position of a second set of wheels 15 (e.g., the front set), the latter being steered by the operator.

Figure 2:
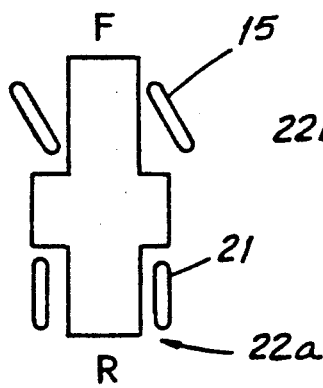
FIG. 2 is a symbolic top plan view of a vehicle in a front wheel steering mode.
Figure 3:
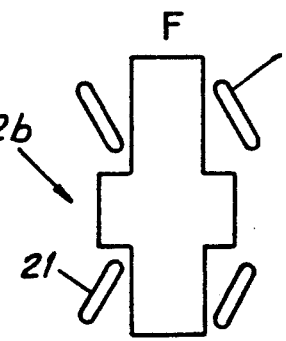
FIG. 3 is a symbolic top plan view of a vehicle in a combination cramp steering mode.
Figure 4:
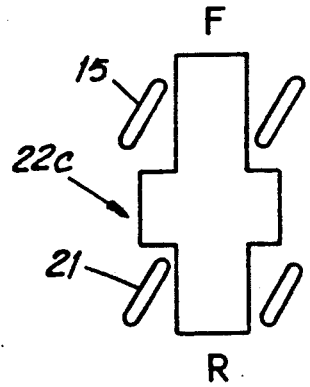
FIG. 4 is a symbolic top plan view of a vehicle in a crab steering mode.

Designers of such vehicles usually provide for several different steering modes. In one such mode illustrated by the symbol 22a of FIG. 2, the rear wheels 21 are locked in the centered position and only the front wheels 15 are steered. In another such mode as shown by the symbol 22b of FIG. 3, often called combination cramp steering, the front wheels 15 are turned in one direction and the rear wheels 21 automatically controlled to turn in the opposite direction. In yet another mode shown by the symbol 22c of FIG. 3, often referred to as "crab" steering, the rear wheels 21 are automatically controlled to turn in the same direction as the front wheels 15. The vehicle thereby moves angularly, much like a crab. The improved controller 10 is configured to provide the steering capabilities shown in FIGS. 2 and 3. However, it is easily modified as explained below to also provide crab steering capability as shown in FIG. 4.

Referring to FIGS. 1, 5, 6, 7 and 8, the controller 10 generally includes a control panel 23 which both receives and provides signals relating to aspects of controller operation. A gauge assembly 25 displays selected information as described below. A hydraulic valve 27 is coupled to the control panel 23 for actuating hydraulic steering cylinders 29 connected to steer the rear wheels 21. Steering systems using one such hydraulic cylinder 29 are also well known and the controller 10 is compatible with steering systems of either type. Signal generators 31, 33 are provided, one each at the front wheels 15 and rear wheels 21, respectively. Preferably each such signal generator 31, 33 includes a potentiometer 35 having its movable element 37 coupled to a wheel kingpin 39. A particular steering mode is selected by the operator using the mode selector switch 41.

Figure 5:
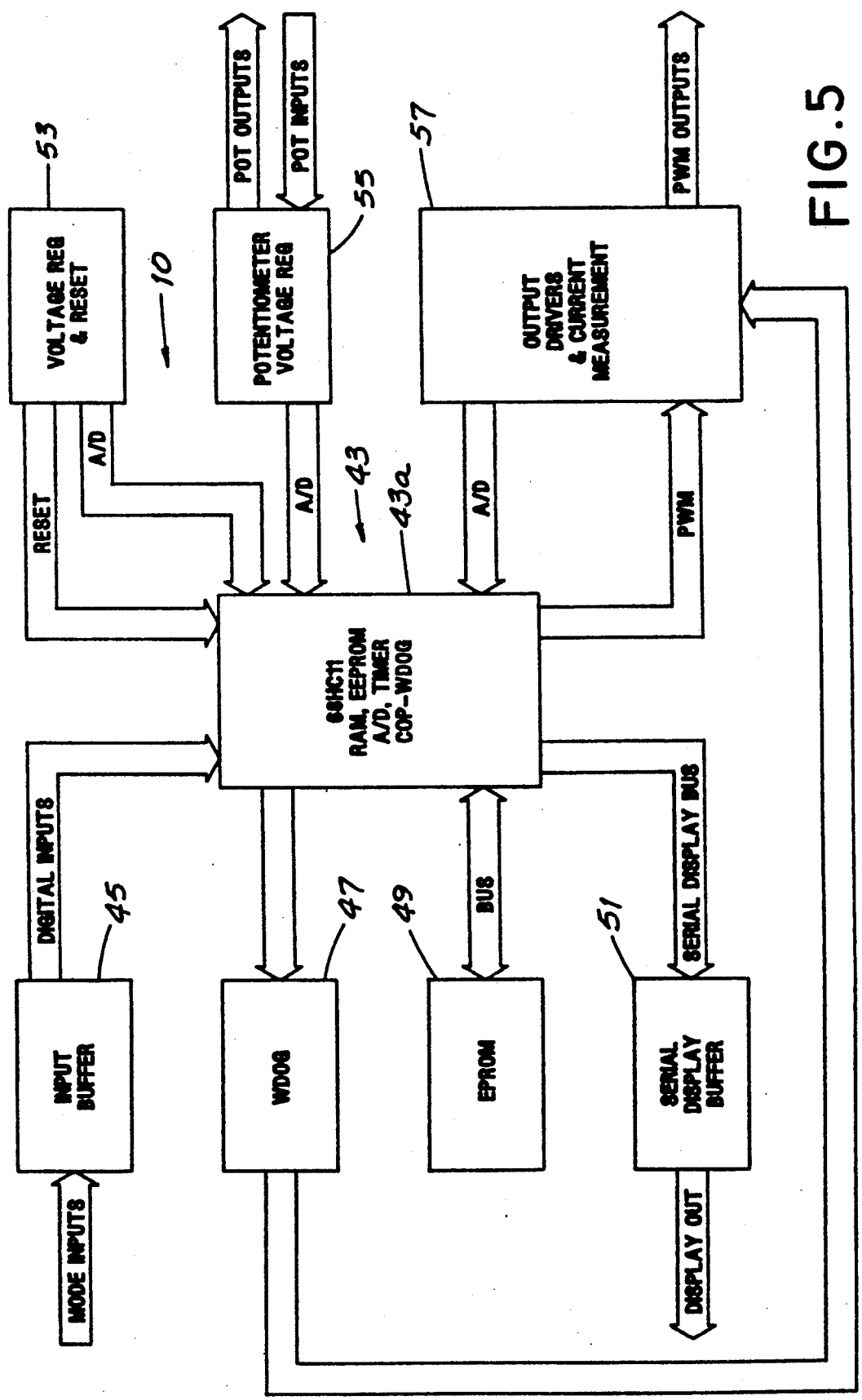
FIG. 5 is a block diagram of the circuit of the inventive controller.

As shown in FIG. 5, the control panel 23 has a computing section 43 and in a highly preferred embodiment, such section 43 includes a Motorola MC68HC11 microcontroller 43a. An input buffer 45, watchdog circuit 47, EPROM memory section 49 and serial display buffer 51 are connected to the computing section 43 as are a voltage regulator and reset circuit 53, a potentiometer regulator circuit 55 and an output driver and current measurement circuit 57. The selector switch 41 is connected to the input buffer 45, the gauge assembly 25 to the display buffer 51, the signal generators 31, 33 to the circuit 55 and the valve to the circuit 57.

Following execution of the calibration procedure described below, the control panel 23 will have reference data embedded therein representing the centered position for the first or rear set of wheels 21 as well as such position for the second or front set of wheels 15. It is to be appreciated that the computing section 43 per se has a memory section in addition to the section 49 shown in FIG. 5. It is to be understood that the term "memory section" refers generally to a solid state device or devices having a memory capability.

Figure 6:
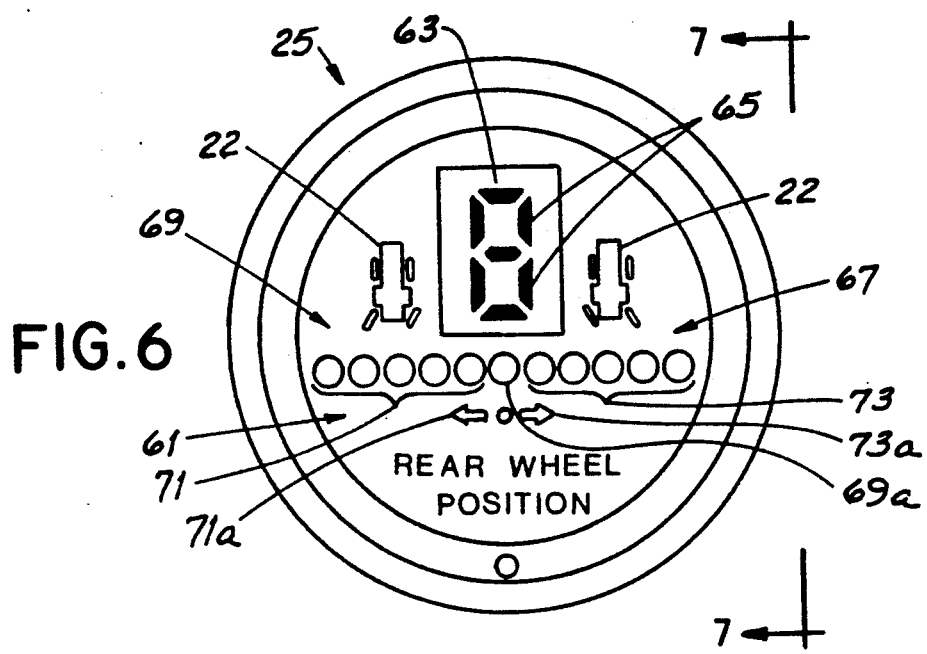
FIG. 6 is a front elevation view of a gauge assembly.
Figure 7:
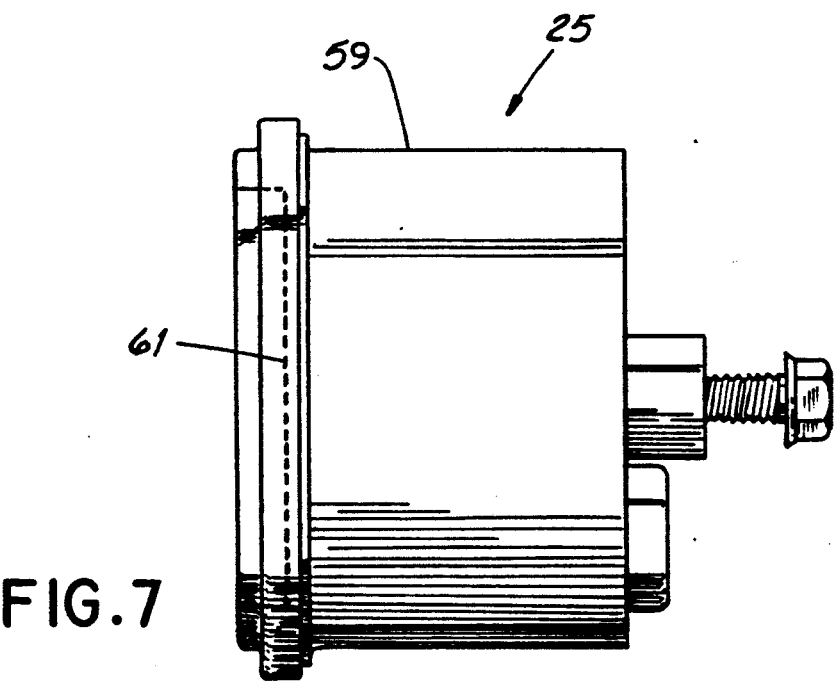
FIG. 7 is a side elevation view, partly in phantom, of the gauge assembly of FIG. 6 taken along the viewing plane 7—7 thereof.

As shown in FIGS. 1, 6 and 7, the gauge assembly 25 is mounted for easy viewing by the operator and includes a generally cylindrical housing 59 and a face 61. A visual display 63 of the alpha-numeric type is provided to receive signals from the computing section 43 for displaying the mode of operation such as calibration mode, "learn" mode, combination cramp steering mode as well as other information. Such display 63 is often referred to as a "7-segment" display since it uses seven segments 65 arranged as shown, each such segment 65 being of the liquid crystal type. Selected segments 65 are switched "on" to display individual alphabet letters as well as numerals. For example, the letter "E" is displayed by switching on the left side segments 65, the top segment 65, the center segment 65 and the bottom segment 65. Similarly, the numeral "4" is displayed by switching on the left upper segment 65, the middle center segment 65 and the right side segments 65.

The gauge assembly 25 also includes a visual indicator 67 of the quasi-analog type for receiving signals from the computing section 43 and providing a signal representing the approximate magnitude of angular displacement of the first set of wheels 21 from the "wheel centered" position. By viewing such indicator 67, the vehicle operator is also apprised of the direction of such displacement either side of center. Such indicator is referred to as being of the quasi-analog type since it uses a number of individual markers 69, each of which is capable of exhibiting either of two binary states, e.g., on or off.

In a highly preferred embodiment, such markers 69 define a bar-like display. When the first set of wheels 21 is at the centered position, only the center marker 69a is on. As such wheels 21 are displaced through an angle from the centered position, one or more markers 69 change binary state. And a progressively greater number of markers change state with increasing angular displacement of the wheels 21 from center. Although the bar-like display is made up of discrete binary markers 69, the visual impression received by the operator is analog in nature. That is, the bar-like display shows the approximate magnitude of displacement in that its apparent length generally increases with increasing angular wheel displacement and decreases with decreasing displacement.

Preferably, such markers 69 are arranged into first and second marker groups 71, 73, respectively, separated by the center marker 69a. These first and second groups 71, 73 indicate angular displacement in first and second directions 71a, 73a, respectively, from the centered position. Determination of the direction of displacement is aided by the inclusion of two symbols 22 on the face (somewhat like those shown in FIGS. 3 and 4), each symbol 22 correlating with a particular marker group. For greater visual contrast, it is preferred that the center marker 69a be of a color, e.g., green, which contrasts with the color of the markers 69 in the groups 71, 73. Yellow may be used for the latter color although any contrasting colors are suitable.

Four wheel steer vehicles of the type described above often have the rear set of wheels 21 angularly positioned by at least one hydraulic cylinder 29 coupled to a control valve 27 operable over an input power range. In a highly preferred embodiment, the control valve 27 is a Rexroth Model MP-18 series control valve, with a proportional pressure reducing valve, type DRE2K, series 1X. Such control valve 27 is of the pulse width modulated type wherein electrical "pulses" are applied to the valve coil 75. Such pulses are of generally constant amplitude but have a "width" or duration which can be varied to control the input power to the valve 27.

The new controller 10 incorporates a setup sequence (further described below) during which small, sequential increments of increasing input power are applied to the valve 27 until a wheel movement signal is produced. Such signal may be produced by a signal generator 31 or 33 such as a potentiometer 35 having its movable element 37 coupled to a wheel kingpin 39 for movement substantially coincident with that of the kingpin 39.

The aforementioned input power is referred to as the "threshold power" since it is the minimum input power at which wheel steering movement occurs. The signal representing such input power is "learned" by storing it in the memory section 49 of the control panel 23. Thereafter when angular steering is required, input power is applied to the valve 27 at or above the threshold power level. This feature helps decrease the time required to place the controller 10 into operation since the threshold power need not be determined and set by a technician.

Such wheel movement signal occurs at a value of electrical current in the control valve 27, sometimes referred to as the "threshold current." In a highly preferred embodiment, a signal representing such value of current is also "learned" by storing a signal representing it in the memory section 49. This stored signal is of significant value for the following reason. Because of valve operation and/or changes in ambient temperature, the valve coil temperature changes and with it, the electrical resistance of the coil 75. The controller 10 uses such stored current signal to compensate for changes in coil resistance by slightly increasing or decreasing the voltage applied to the coil 75.

Figure 8:
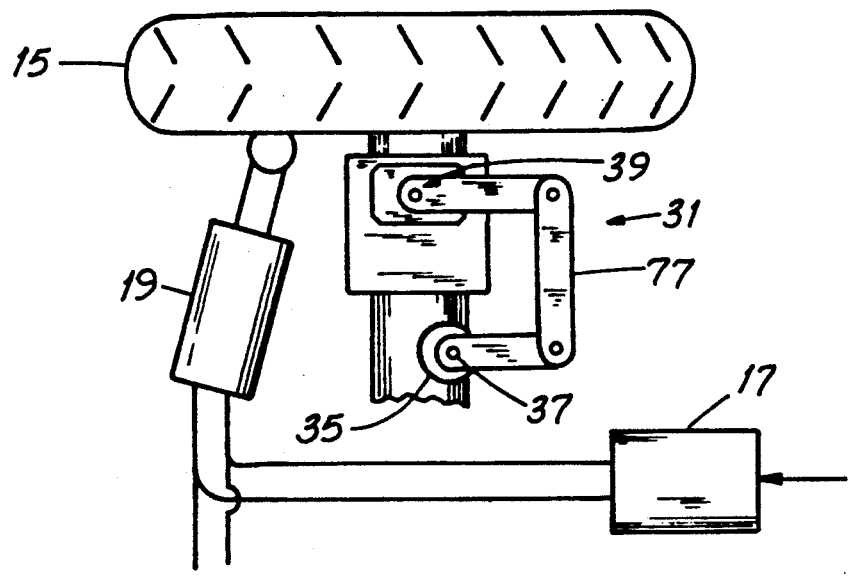
FIG. 8 is a representative top plan view of a signal generator shown in conjunction with a steerable wheel arrangement and with parts broken away.

FIG. 8 illustrates how a signal generator 31, 33 such as a potentiometer 35 is used with each of the steerable wheels 15, 21 of a vehicle. In many types of wheeled vehicles, each of the steered wheels 15, 21 is attached to and supported by a kingpin 39, a generally vertically arranged rod-like component. Such kingpin 39 rotates when the wheels 15, 21 are steered and the angle and direction such kingpin rotation is generally coincident with angular displacement and steering direction of such wheels 15, 21. The potentiometer 35 has its movable element 37 connected to the kingpin 39 by a lever arrangement 77 so that such element 37 rotates coincident with kingpin rotation. In a highly preferred embodiment, the potentiometer 35 has a total resistance of 1000 ohms and, for reasons explained below, an active range of about 70° rotation. Ways to provide potentiometer-kingpin attachment are generally well known and need not be further described. It should be appreciated from FIG. 1 that each set of wheels 15, 21 has a signal generator 31, 33, respectively.

As described above with regard to certain earlier controllers, field service personnel often have little information available on which to base a troubleshooting diagnosis and repair. The improved controller 10 overcomes this deficiency in that it detects "errors," i.e., failures or out-of-range values in components and parameters associated with the controller 10. For example, such detected errors may include a low voltage condition, a current overload and certain open or short circuit conditions in a potentiometer 35.

A listing of preferred error codes is set forth below:

E1.0—LOW VOLTAGE ERROR—SYSTEM LESS THAN APPROX 9.7 V
E2.1—OUTPUT OPEN PWM1
E2.2—OUPTUT OPEN PWM2
E3.1—CURRENT OVERLOAD PWM1 OUTPUT
E3.2—CURRENT OVERLOAD PWM2 OUTPUT
E4.0—FRONT POT HIGH OPEN
E4.1—REAR POT HIGH OPEN
E4.2—FRONT POT LOW OPEN
E4.3—REAR POT LOW OPEN
E4.4—FRONT POT SENSE OPEN OR GROUNDED
E4.5—REAR POT SENSE OPEN OR GROUNDED
E4.6—FRONT OR REAR POT HIGH GROUNDED
E4.7—FRONT OR REAR POT LOW GROUNDED
E4.8—GENERAL POT WIRING ERROR CANNOT PINPOINT
E5.1—LEARN ERROR—NO MOVEMENT DETECTED IN PWM1
E5.2—LEARN ERROR—NO MOVEMENT DETECTED IN PWM2
E6.0—CONTROL SENSES BOTH CRAB AND FOUR WHEEL SWITCHES ON
E9.0—5 VOLT LOW OR 8 VOLT HIGH OR A/D FAILURE
E9.1—8 VOLT LOW OR 5 VOLT HIGH OR A/D FAILURE
E9.2—INVALID OP CODE FAILURE
E9.3—EPROM CHECKSUM FAILURE
E9.4—RAM CHECK SUM FAILURE
E9.5—PWM1 OUTPUT CONDUCTING WHEN OFF
E9.6—PWM2 OUTPUT CONDUCTING WHEN OFF
E9.7—CLOCK MONITOR FAILURE
E9.8—EEPROM CHECKSUM FAILURE

An occurrence of the error represented by code E1.0 will prevent energization of the coils 75 in the valve 27 so long as it exists. When voltage returns to the proper range, the error becomes "self-healing" and operation may continue. The error represented by code E6.0 is also self-healing but the controller 10 permits only front wheel steering while it persists. In a highly preferred embodiment, the controller 10 deactivates the control valve 27 when any one of most listed errors is detected. This helps prevent operation under conditions which may damage the vehicle. In general, errors represented by code prefix E9 are not field serviceable.

When properly "interrogated" by a service person, the visual display 63 provides "last error recall" by displaying the last error detected by the controller 10. For example, it is assumed the terminal at the high resistance end of the potentiometer 35 in front signal generator 31 is temporarily open-circuited. Upon detection of this error, the controller 10 will display the appropriate error code (the characters "E," "4" and "0" in sequence) and will shut down the automatic steering system. Sometimes an error is "cleared" by turning the vehicle off and back on. It is assumed this is done and that such activity somehow clears the error and the vehicle resumes normal operation.

Further assuming that the operator requested the aid of a service person, such person can "interrogate" the controller 10 by moving the mode switch 41 to the crab steering position and depressing the calibration button 79 with the vehicle engine running. Thereupon, the characters "E," "4" and "0" will again appear in sequence on the display 63. One will appreciate how this feature is especially helpful where the error is of an intermittent nature. Diagnosis and repair proceed much more quickly and the availability or "uptime" of the vehicle is thereby improved.

The calibration procedure will be better understood by first appreciating that the "steering range" of the potentiometer movable element 37 is preferably about 26° either side of a position identified as the center position or a total of about 52° of the available 70° span. In fact, the movable element 37 need not be precisely at such center position in order to indicate that the wheels 15 or 21 are centered. Such movable element 37 may be anywhere within an angular centering range of 5° (as an example) either side of the actual potentiometer center.

To calibrate the potentiometers 35, the vehicle engine is started and the mode switch 21 moved to the crab steering position. Using the steering wheel 13, the front wheels 15 are centered and centering is verified by actual measurement. The crab rocker switch 81 is used to center the rear wheels 21 and centering is likewise verified by measurement. The engine is then turned off. The calibration button 79 is depressed and while doing so, the ignition key (not shown) is turned on.

After the button 79 is released, the characters "C," "A," "L" and "F" appear in sequence on the display 63 to indicate the calibrate mode for the front potentiometer 35. Active marker(s) 69 on one side or the other of the center marker 69a show the approximate position of the movable element 37 of the potentiometer 35 if such element 37 is not within the centering range. If such element 37 is outside such range, the movable element 37 is rotated until only the center marker 69a is active whereupon the potentiometer 35 is tightened.

The button 79 is again depressed and the character "b" appears on the display 63 to indicate that the controller 10 is set for calibrating the "back" or rear potentiometer 35. If necessary, the rear potentiometer 35 is similarly adjusted until only the center marker 69a is active whereupon the rear potentiometer 35 is tightened. The calibration button 79 is then depressed and released again. It is to be appreciated from the foregoing that calibration is achieved using the visual display 63 and visual indicator 67 and that a volt-ohmmeter is not required therefor.

The following describes the steps in the "learn" procedure of the setup sequence. Execution of such sequence results in those signals representing the threshold input power and valve current which are stored in the memory section 49. The mode switch 41 is placed in the front-wheel-only steering position and the vehicle engine is started. The calibration button 79 is depressed and released whereupon the characters "L" and "—" will appear in sequence to denote the controller 10 is in the "learn mode."

The controller 10 thereupon automatically increases the input power applied to the valve 27 in increments of about ¼% and for a particular direction of intended wheel movement. When a wheel movement signal is produced by the rear potentiometer 35, a signal representing such level of input power is stored in the memory section 49. The controller 10 then automatically increases such input power for the other direction of intended wheel movement until a wheel movement signal is produced. A signal representing such input power is likewise then stored in the memory section 49. It is to be appreciated that the foregoing "learn" procedure is independent of the actual position of the potentiometer movable element 37. Therefore, it can be conducted prior to potentiometer calibration. And if it is necessary to replace a valve 27, the "learn" procedure can be performed without recalibrating the potentiometers 35.

In one preferred embodiment, the controller 10 is configured to provide cramp steering or crab steering, but not both. This is so since these two steering modes require the rear wheels 21 to turn in differing directions for a given direction of steering of the front wheels 15. However, the controller 10 may be configured to provide either cramp or crab steering by the inclusion of a selector switch which reverses the high and low lead wires (not shown) of the rear potentiometer 35.

Figure 9A:
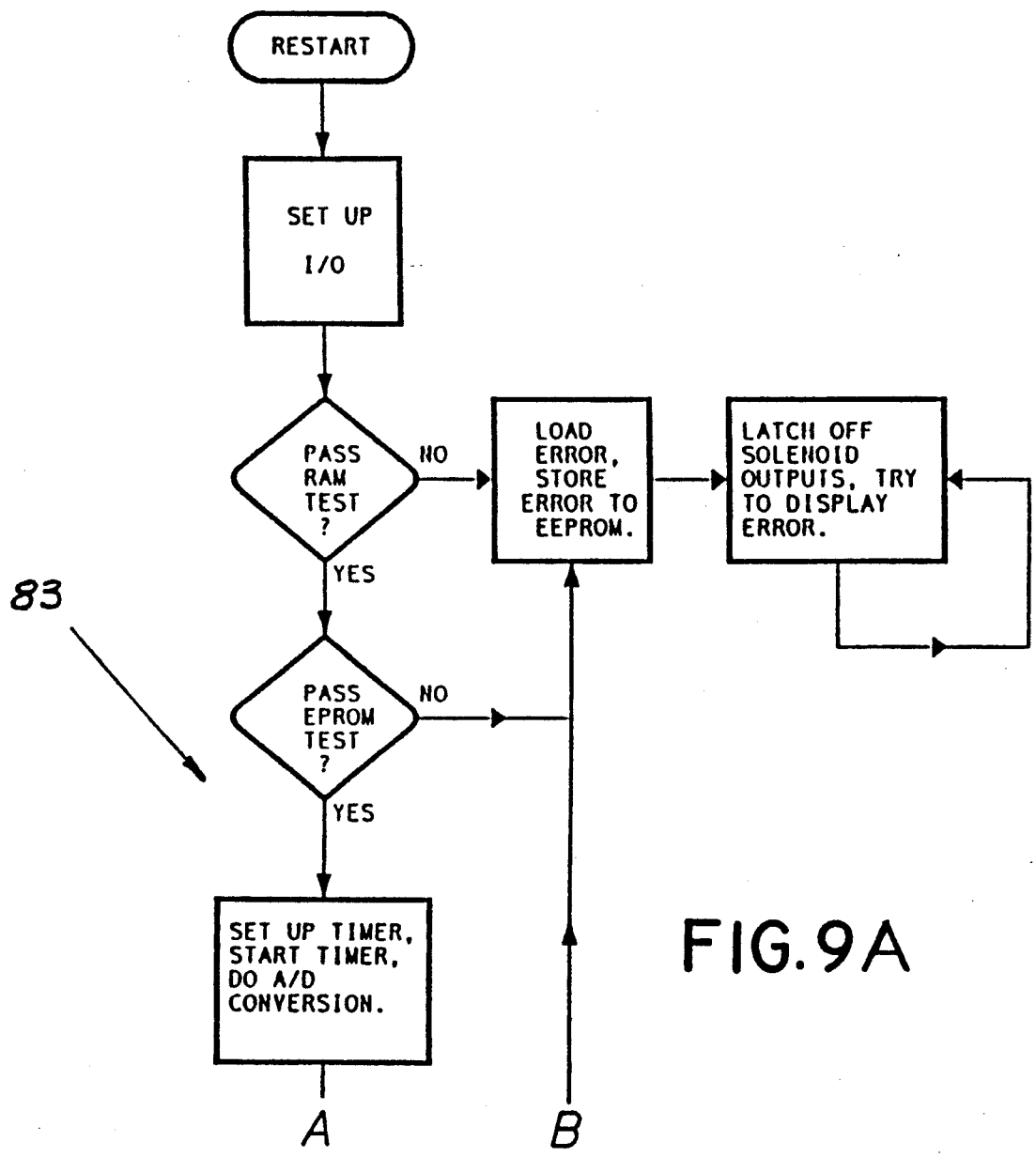
FIGS. 9A and 9B comprise the computer program flow chart for the restarting function.
Figure 9B:
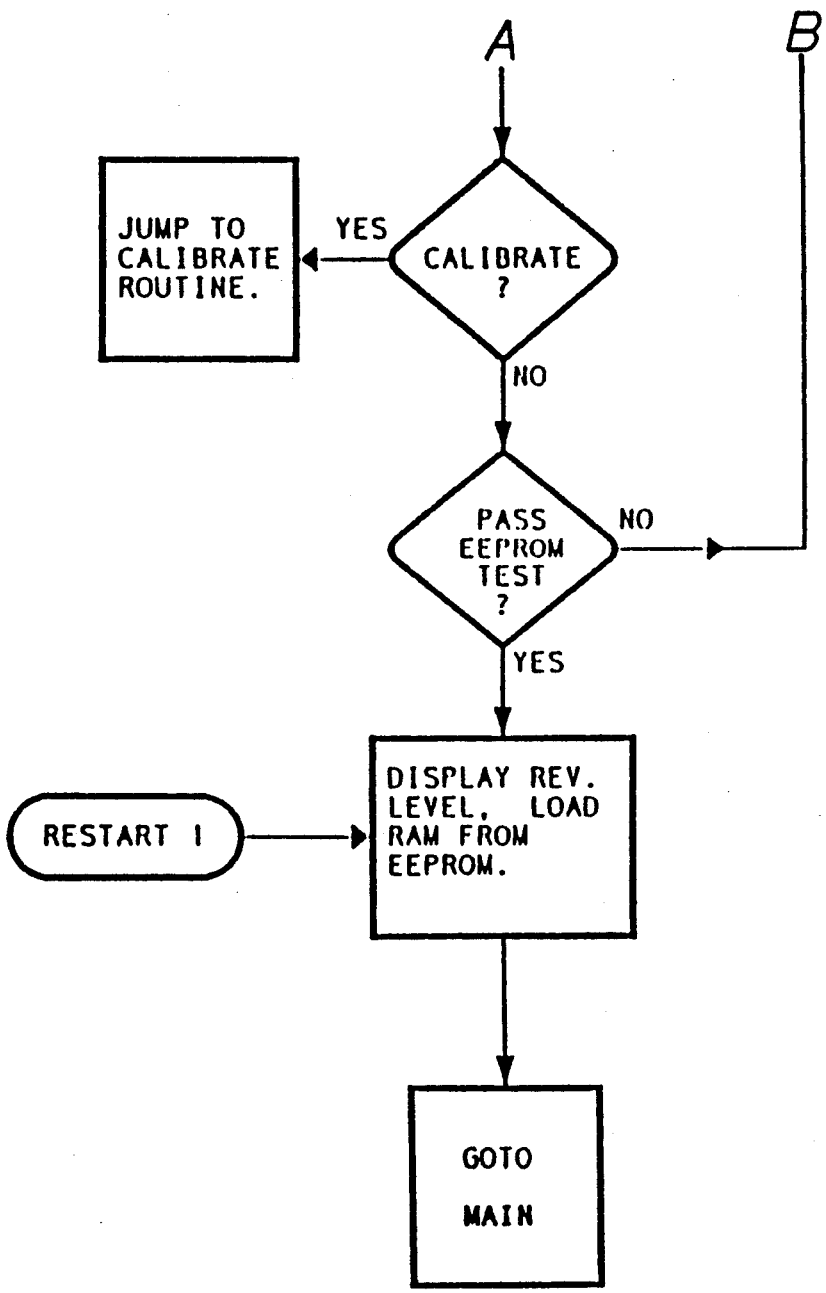
Figure 10:
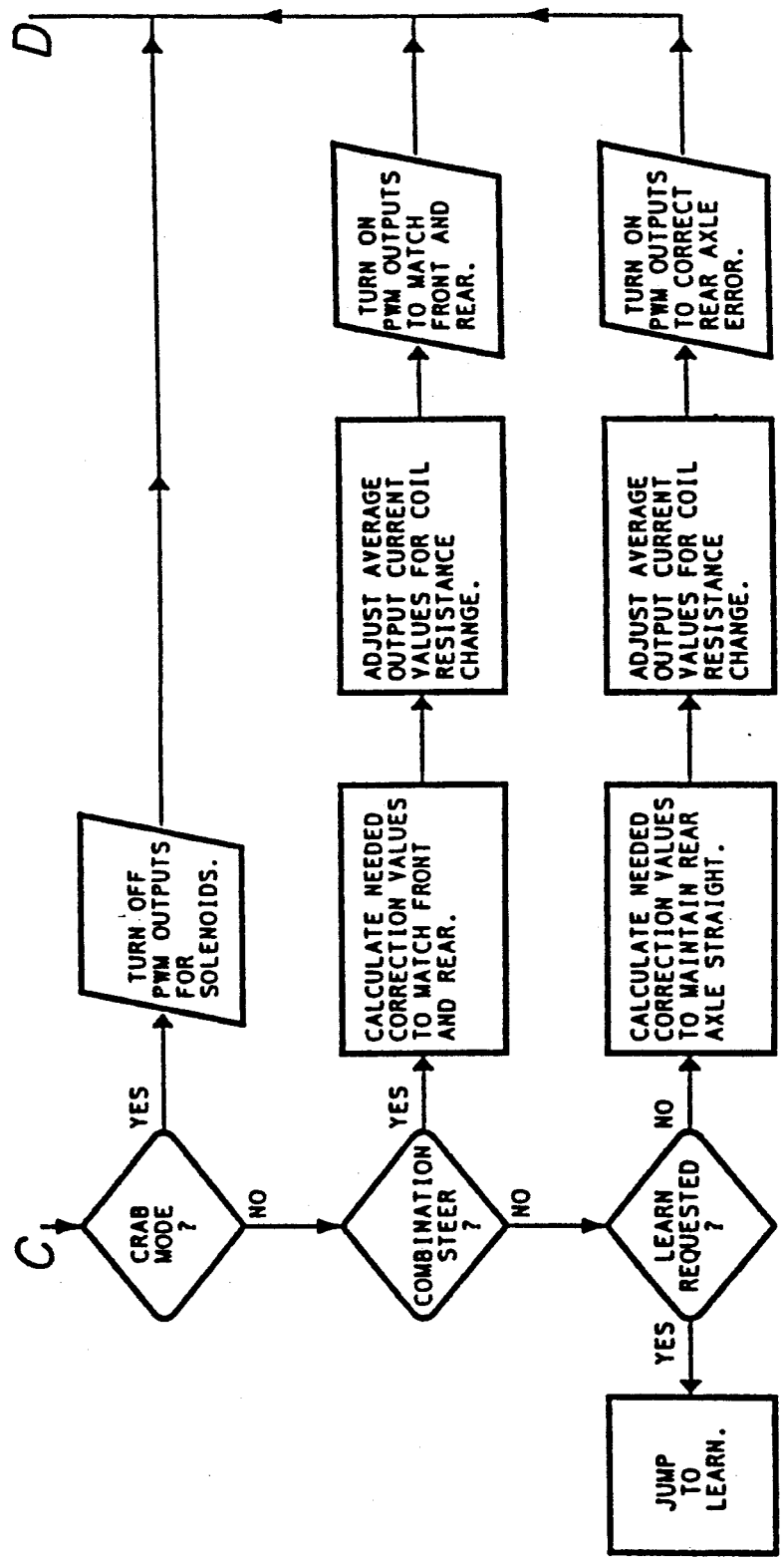
FIGS. 10A and 10B comprise the computer program flow chart for the main operating sequence.
Figure 10B:
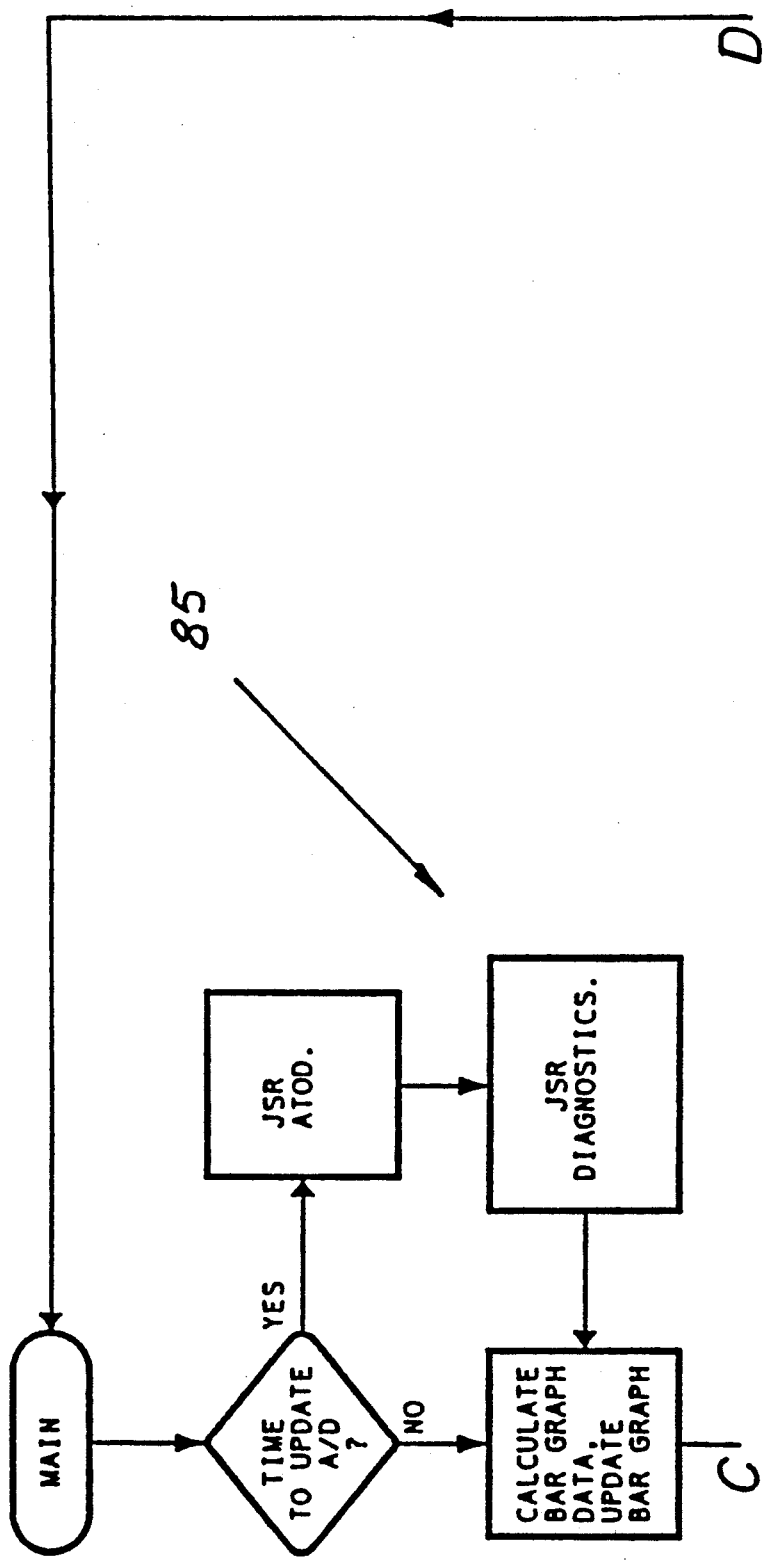
Figure 11A:
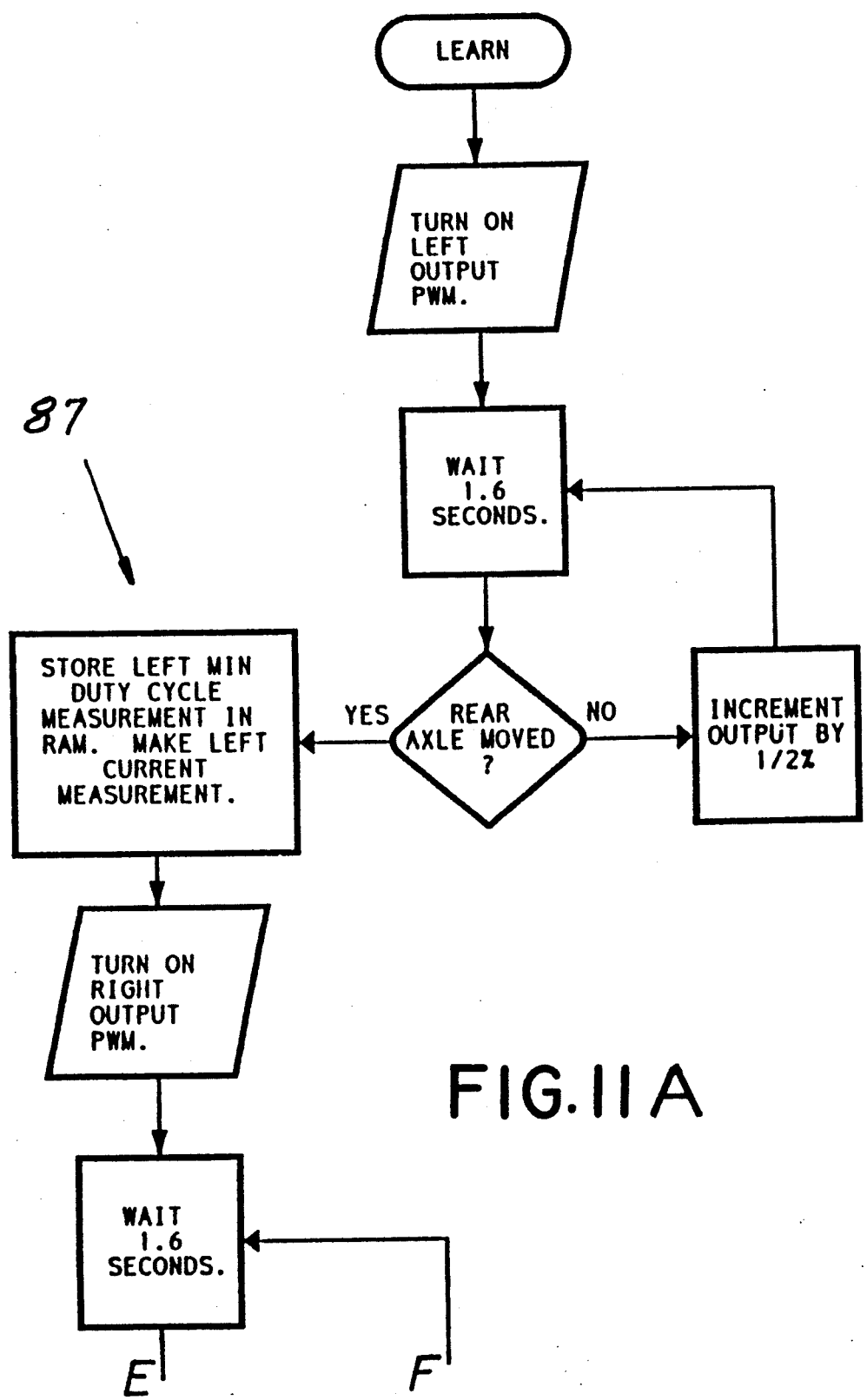
FIGS. 11A and 11B comprise the computer program flow chart for the "learn" procedure.
Figure 11B:
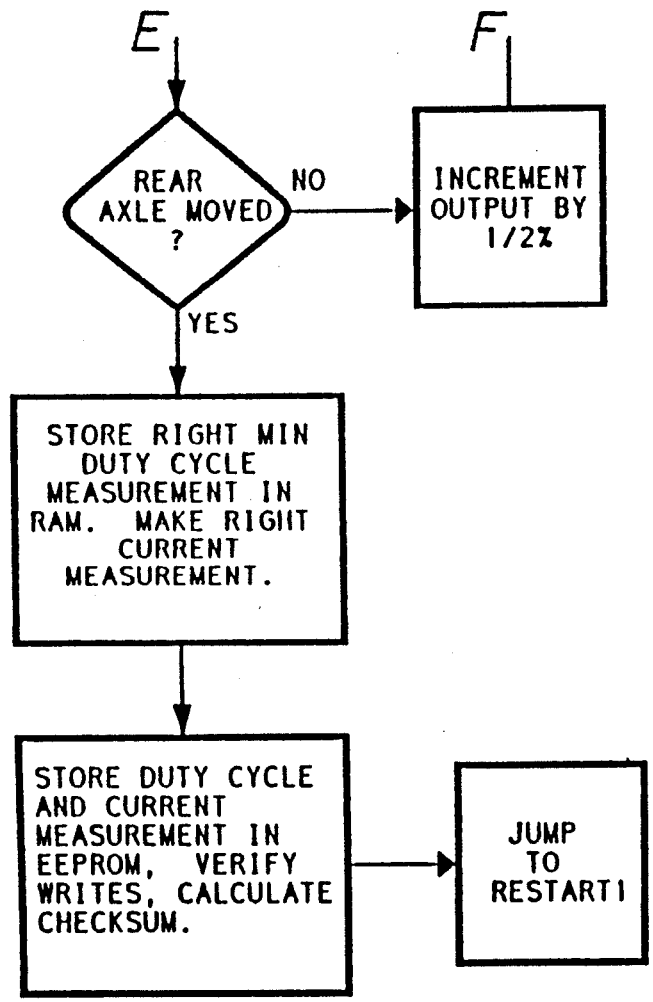
Figure 12:
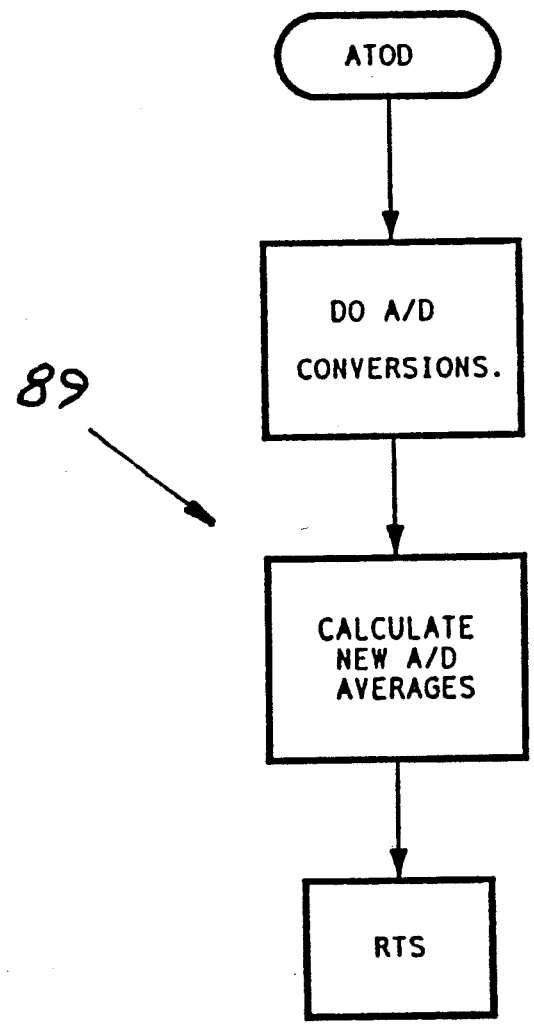
FIG. 12 is the computer program flow chart relating to analog-to-digital conversions.
Figure 13:
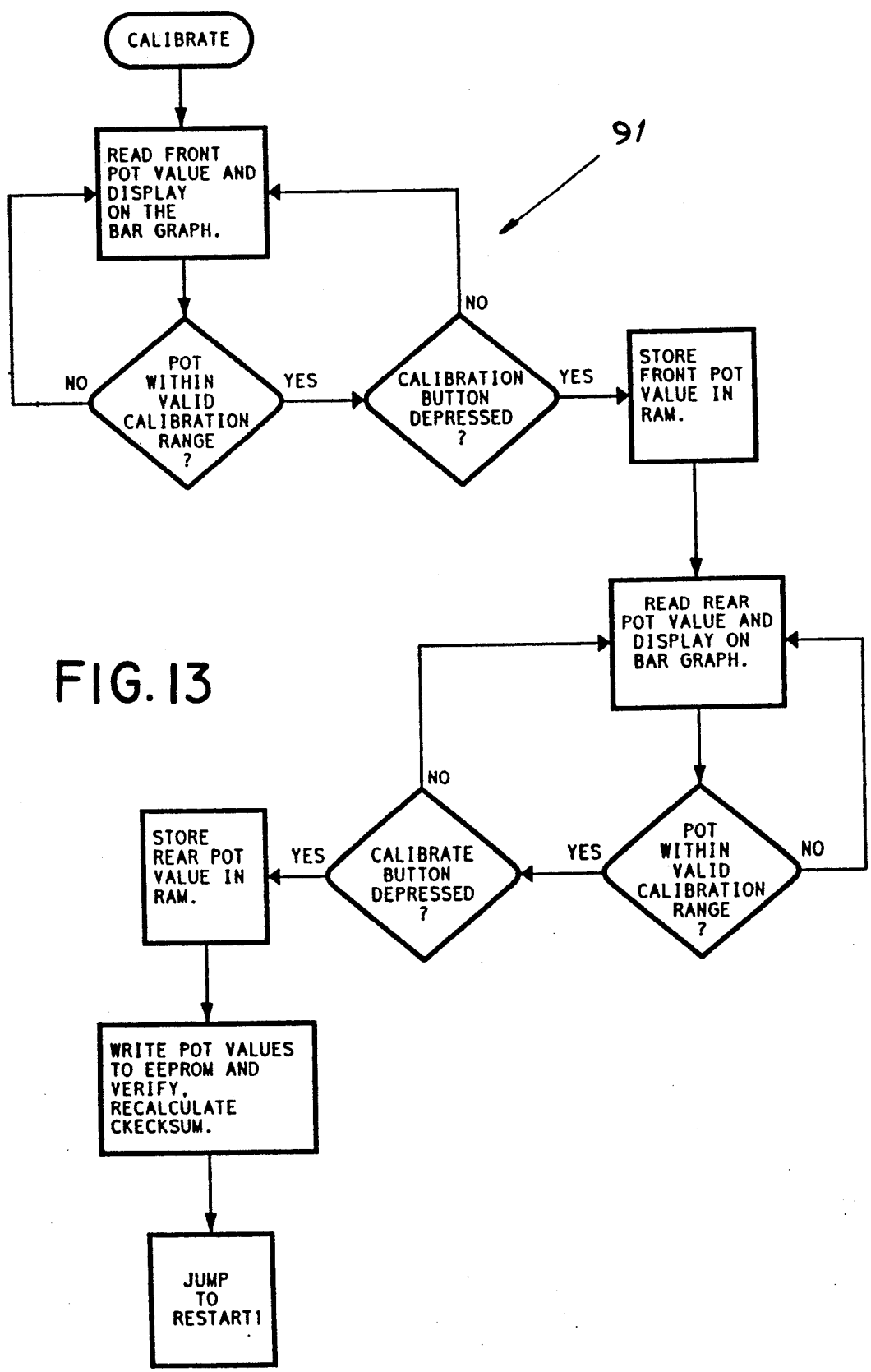
FIG. 13 is the computer program flow chart for the calibration sequence.
Figure 14:
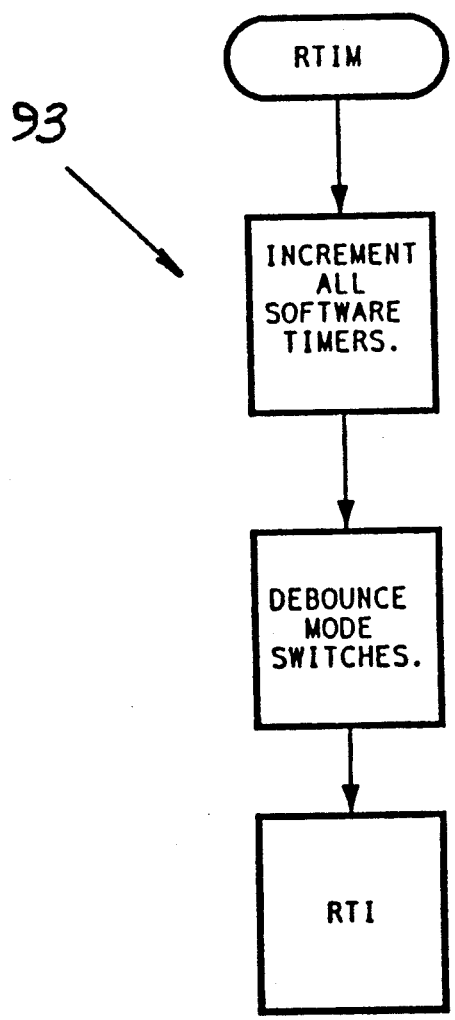
FIG. 14 is the computer program flow chart for the real time interrupt sequence.
Figure 15A:
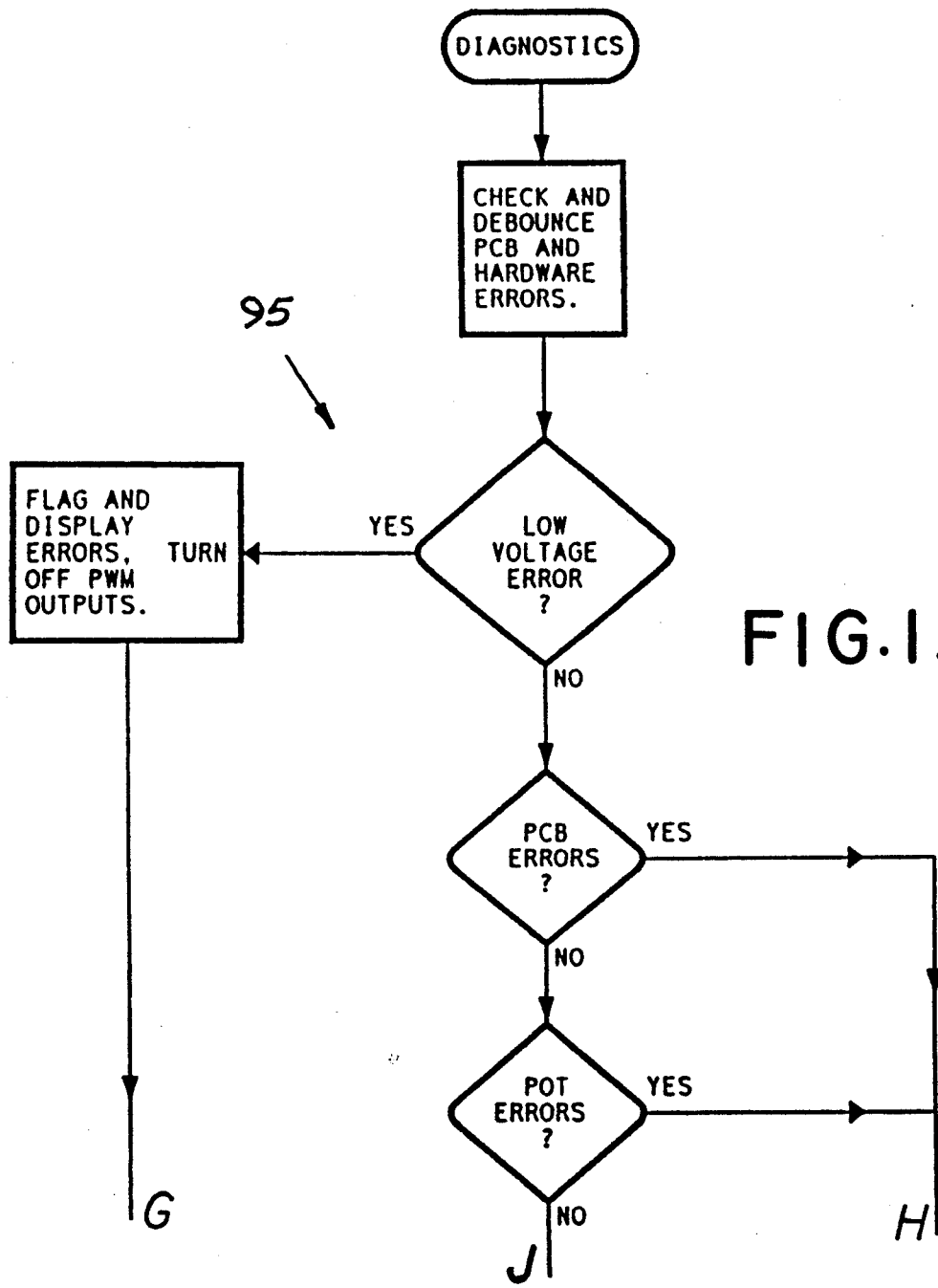
FIGS. 15A and 15B comprise the computer program flow chart for the diagnostics procedure.
Figure 15B:
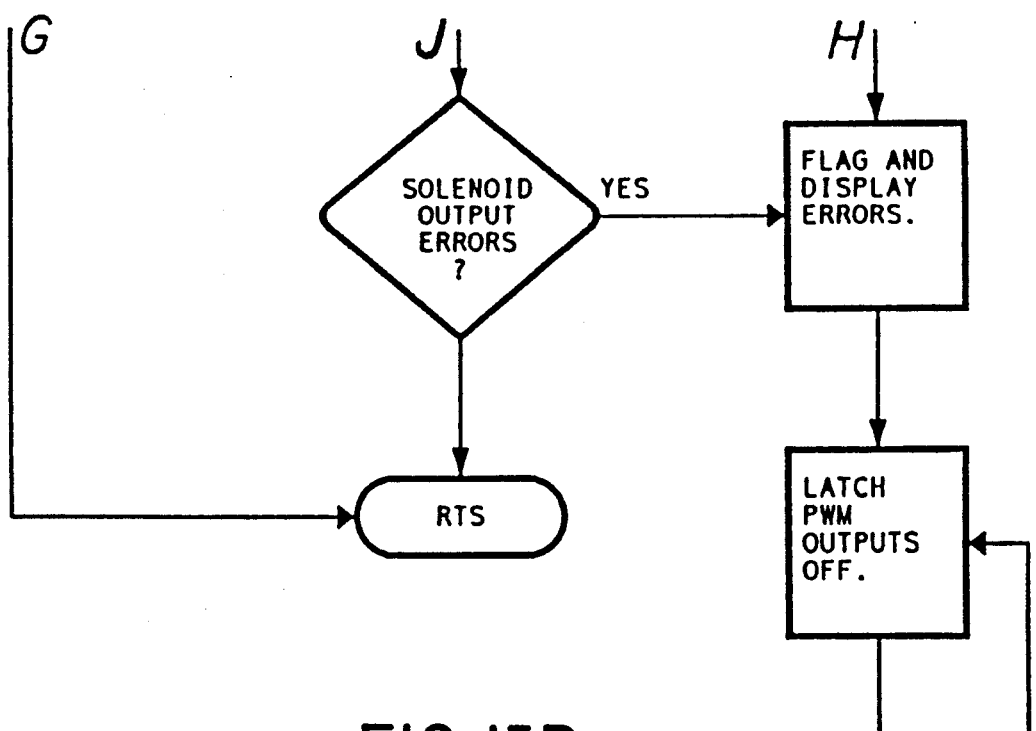

FIGS. 9, 10 and 11 depict the computer program flow charts for the restarting function, the main operating sequence and the "learn" procedure 83, 85, 87, respectively. FIG. 12 depicts the flow chart 89 for performing analog-to-digital conversions while FIG. 13 depicts the flow chart 91 for the calibration sequence. FIG. 14 shows the flow chart 93 for the real time interrupt sequence and FIG. 15 shows the flow chart 95 for the diagnostics procedure.

In the first preferred embodiment described above, the controller 10 provides "matched" steering, i.e., the angular movement of the rear wheels 21 is coincident in magnitude (although not necessarily in direction) to the angular movement of the front wheels 15. In another preferred embodiment, the controller 10 is configured to provide proportional control as described below.

With proportional control, the rear wheels 21 remain centered during an initial, predetermined angular movement of the front wheels 15, e.g., about 12°, either side of center. However, as the front wheels 15 are moved beyond 12°, the rear wheels 21 are angularly moved at an increasing rate. Such rate is selected so that when the front wheels 15 reach the extreme angular position of 26° for example, the rear wheels 21 simultaneously reach the same extreme angular position. FIG. 16 is the computer program flow chart 97 applicable to a second embodiment of the invention providing proportional steering control and is used in place of the flow chart 85 shown in FIG. 10.

In certain situations, proportional control provides important advantages. If the vehicle is towing a cultivating implement in row crops, matched steering usually requires the operator to use front-wheel-only steering while in the rows (for more precise steering control) and switch to the cramp steering mode for turn-arounds at row ends. Proportional steering eliminates the need to switch steering modes since "shallow" corrective steering while in the rows, e.g., front wheel steering angles less than 12°, will be done using only the front wheels 15. For much the same reasons, proportional steering is useful when traveling on roads at higher speeds in that small steering corrections are done with only the front wheels 15. Steering control is therefore more precise.

The controller 10 provides exceptional accuracy in maintaining the rear wheels 21 in the centered or locked position when front wheel only steering is being used. Typically, such rear wheels 21 will be retained within about ¼° of actual center, an accuracy figure significantly better than those of some earlier controllers.

From the foregoing, it will be appreciated that the new controller 10 can be used to steer what are known as articulated vehicles. Such vehicles, like those described above, have manually steerable front wheels 15 but have rear wheels which are not steerable per se. However, the vehicle is "hinged" in the middle and has two articulation cylinders located adjacent the hinge to pivot the vehicle on the hinge. Steering in this way is generally functionally equal to rear wheel steering as described above. Rather than connect the valve 27 to rear wheel steering cylinders 29, such valve 27 is connected to the articulation cylinders to provide four wheel steering in the cramp mode. Crab steering is not possible with articulated vehicles.

While the principles of this invention have been described in connection with specific embodiments, it should be understood clearly that these descriptions are made only by way of example and are not intended to limit the scope of the invention.

We claim:

1. An improved vehicular steering controller for controlling the angular position of a first set of vehicle wheels as a function of the angular position of a second set of wheels and including:

a computing section having embedded therein reference data representing the centered position of the first set of wheels;

a visual display coupled to the computing section, said display being of the alpha-numeric type for displaying a signal representing one of at least two operational modes, one of which is for calibrating the controller; and, a visual indicator coupled to the computing section, said indicator being of the "stepped" quasi-analog type for indicating the approximate magnitude of angular displacement of the first set of wheels from the centered position, and wherein:

the first set of wheels is angularly positioned by at least one hydraulic cylinder coupled to a control valve operable over an input power range; and, the controller incorporates a setup sequence to operate the control valve in sequential increments of increasing input power until a wheel movement signal is produced;

whereby an operator of the vehicle is apprised of the approximate angular position of the first set of wheels and of the operational mode selected.

2. The controller of claim 1 wherein such computing section includes a memory section and wherein a signal representing the input power at which such wheel movement signal is produced is stored in such memory section, thereby decreasing time required to place such controller into operation.

3. The controller of claim 2 wherein such wheel movement signal occurs at a value of electrical current in the control valve and wherein a signal representing such value is stored in such memory section for providing current compensated operation of such control valve.

4. The controller of claim 1 wherein such wheel movement signal is provided by a signal generator having an element which moves substantially coincident with angular displacement of such first set of wheels.

5. The controller of claim 4 wherein at least one of the wheels comprising the first set of wheels has a kingpin and wherein such signal generator is a potentiometer having a movable element coupled to a wheel kingpin.

6. An improved vehicular steering controller for controlling the angular position of a first set of vehicle wheels as a function of the angular position of a second set of wheels and including:

a computing section having embedded therein reference data representing the centered position of the first set of wheels;

a visual display coupled to the computing section, said display being of the alpha-numeric type for displaying a signal representing one of at least two operational modes, one of which is for calibrating the controller; and, a visual indicator coupled to the computing section, said indicator being of the "stepped" quasi-analog type for indicating the approximate magnitude of angular displacement of the first set of wheels from the centered position, whereby an operator of the vehicle is apprised of the approximate angular position of the first set of wheels and of the operational mode selected and wherein:

the controller detects errors in components associated therewith and the visual display selectively displays the last error detected by the controller, thereby decreasing time required to diagnose and remedy the error.

7. The controller of claim 6 wherein component errors detected by such controller include low system voltage, current overload and potentiometer defects.

8. The controller of claim 7 wherein such first set of wheels is angularly positioned by at least one hydraulic cylinder coupled to a control valve and wherein such controller deactivates such control valve when an error is detected.

9. In combination, a wheeled vehicle having first and second sets of wheels and an improved vehicular steering controller to regulate the angular position of the first set of wheels as a function of the angular position of the second set of wheels, and wherein the vehicle includes:

at least one hydraulic cylinder to position the first set of wheels, the cylinder being coupled to a control valve operable over an input power range;

and wherein the controller includes:

a setup sequence to operate the control valve in sequential increments of increasing input power until a wheel movement signal is produced;

a computing section having embedded therein reference data representing the centered position of the first set of wheels;

a visual display of the alpha-numeric type to receive signals from the computing section and display an operational mode; and a visual indicator of the quasi-analog type to receive signals from the computing section and provide a signal representing the approximate magnitude of angular displacement of the first set of wheels from the centered position.

10. The combination of claim 9 wherein the computing section includes a memory section and wherein a signal representing the input power at which such wheel movement signal is produced is stored in the memory section, thereby improving controller response.

11. The combination of claim 10 wherein the wheel movement signal occurs at a value of electrical current in the control valve and wherein a signal representing the value is stored in the memory section to provide current-compensated operation of the control valve.

12. The combination of claim 9 wherein the wheel movement signal is provided by a signal generator having an element which moves substantially coincident with angular displacement of the first set of wheels.

13. The combination of claim 12 wherein at least one of the wheels comprising the first set of wheels has a kingpin and wherein the signal generator is a potentiometer having a movable element coupled to a wheel kingpin.

14. An improved vehicular steering controller for regulating the angular position of a first set of vehicle wheels as a function of the angular position of a second set of wheels and including:

plural control components;

a computing section having embedded therein reference data representing the centered position of the first set of wheels;

a error detector coupled to the computing section for detecting errors in the control components;

a visual display of the alpha-numeric type to receive signals from the computing section and selectively display the last error detected; and, a visual indicator of the quasi-analog type to receive signals from the computing section and provide a signal representing the approximate magnitude of angular displacement of the first set of wheels from the centered position.

15. The controller of claim 14 wherein detected errors include low system voltage, current overload and potentiometer defects.

16. The controller of claim 15 wherein the first set of wheels is angularly positioned by at least one hydraulic cylinder coupled to a control valve and the controller deactivates the control valve when an error is detected.

* * * * *